United States Patent
Nagasaka et al.

(10) Patent No.: US 6,364,961 B1
(45) Date of Patent: Apr. 2, 2002

(54) SPIN-VALVE MAGNETIC HEAD WITH THE PINNED LAYER HAVING DIFFERENT DIRECTIONS FOR ITS MAGNETIZATION AXIS AND ITS EASY AXIS

(75) Inventors: Keiichi Nagasaka; Yutaka Shimizu; Hitoshi Kishi; Atsushi Tanaka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/434,989

(22) Filed: Nov. 5, 1999

Related U.S. Application Data (62) Division of application No. 09/024,074, filed on Feb. 17, 1998, now Pat. No. 6,034,845.

(30) Foreign Application Priority Data

Sep. 11, 1997 (JP) ............................................. 9-247267

(51) Int. Cl.$^7$ ............................................... H01F 10/32
(52) U.S. Cl. .................................... 148/108; 29/603.08
(58) Field of Search ......................... 148/108; 29/603.08

(56) References Cited

U.S. PATENT DOCUMENTS

| | | | |
|---|---|---|---|
| 5,648,885 A | 7/1997 | Nishioka et al. ............ 360/113 |
| 6,033,491 A | * 3/2000 | Lin .............................. 148/108 |
| 6,123,780 A | * 9/2000 | Kanai et al. ................. 148/108 |
| 6,129,957 A | * 10/2000 | Xiao et al. ................... 427/548 |
| 6,224,719 B1 | * 5/2001 | Westwood ............... 204/192.2 |

FOREIGN PATENT DOCUMENTS

JP 6-333770 12/1994

* cited by examiner

Primary Examiner—John Sheehan
(74) Attorney, Agent, or Firm—Greer, Burns & Crain, Ltd.

(57) ABSTRACT

A method is disclosed for magnetizing a magnetic system including a ferromagnetic layer magnetized in a first direction and an anti-ferromagnetic layer provided on said ferromagnetic layer in exchange coupling therewith. The method includes a first thermal annealing process including the sub-steps of annealing the magnetic system in a first annealing state, and applying a magnetic field to the magnetic system in a second direction different from the first direction, while maintaining the magnetic system in the first annealing state. A second thermal annealing process includes the sub-steps of annealing the magnetic system after the first thermal annealing process, to a second annealing state, and applying a magnetic field in a third direction different from the second direction while maintaining the magnetic system in the second annealing state.

6 Claims, 10 Drawing Sheets

SPIN-VALVE MAGNETIC HEAD WITH THE PINNED LAYER HAVING DIFFERENT DIRECTIONS FOR ITS MAGNETIZATION AXIS AND ITS EASY AXIS

This is a divisional, of application Ser. No. 09/024,074, filed Feb. 17, 1998 now U.S. Pat. No. 6,034,845.

BACKGROUND OF THE INVENTION

The present invention generally relates to magnetic heads and more particularly to an improvement of a GMR (giant magneto-resistance) head having a so-called spin-valve structure.

A GMR head is a high-sensitivity magnetic head that detects a change of resistance of a magnetic layer that in turn occurs in response to a change of direction of a very weak external magnetic field. Because of the high magnetic sensitivity, a GMR head is expected to play a major role in a high-density magnetic recording apparatus as a high-resolution and high-sensitivity magnetic head.

Figure 1:
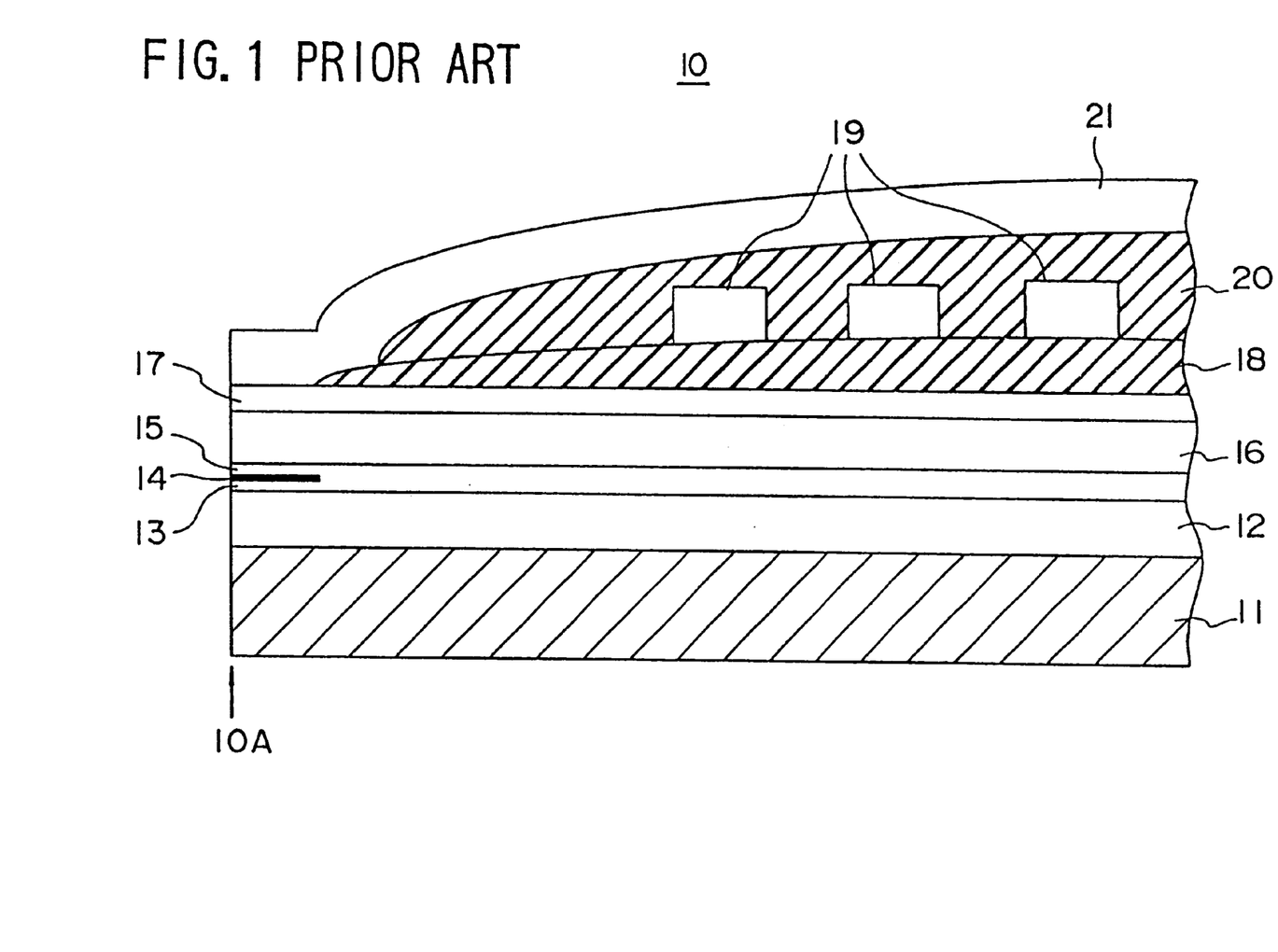
FIG. 1 is a diagram showing the construction of a conventional magnetic head that uses a conventional spin-valve magnetic sensor.
Figure 2:
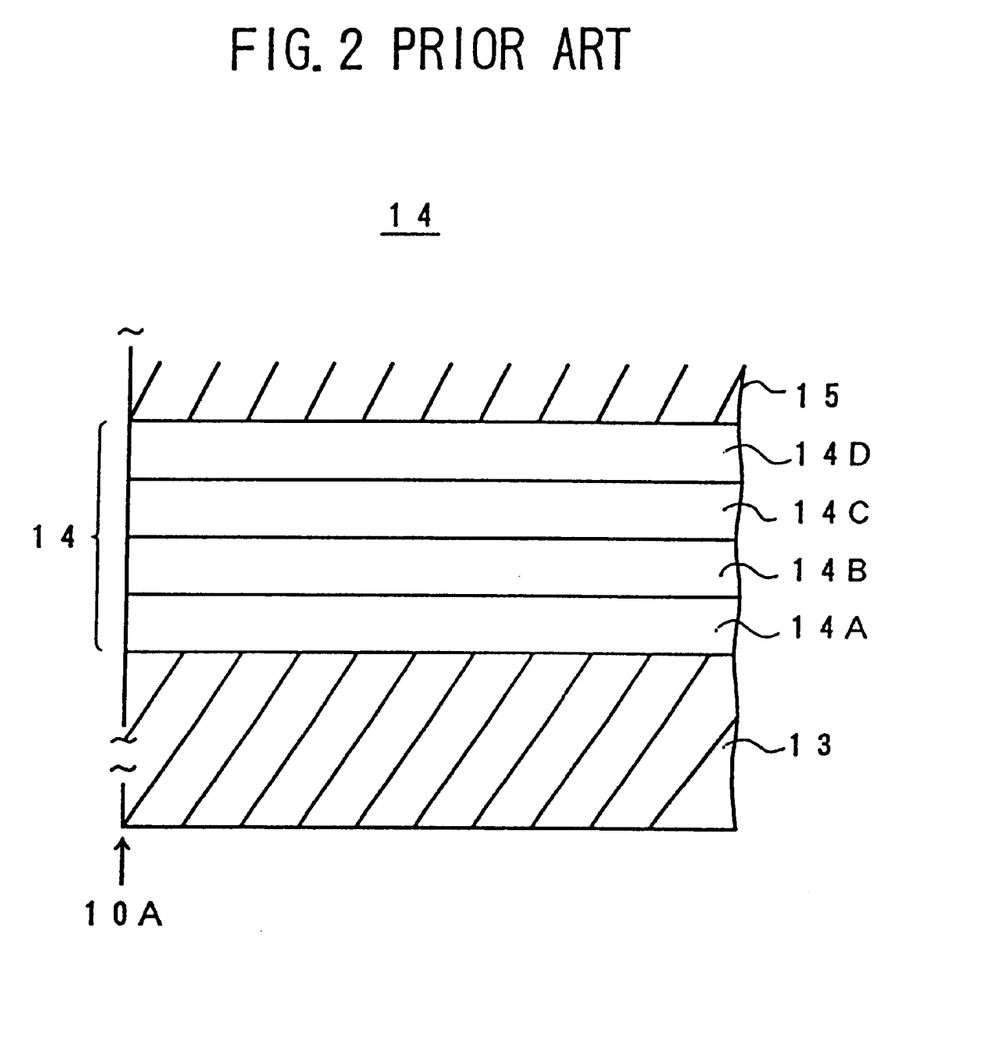
FIG. 2 is a diagram showing the construction of a conventional spin-valve magnetic sensor.

FIG. 1 shows the overall construction of a magnetic head 10 having a typical conventional spin-valve structure, while FIG. 2 shows the construction of a spin-valve head 14 used in the magnetic head of FIG. 1.

Referring to FIG. 1, the magnetic head 10 includes a lower magnetic shield layer 12 of a magnetic material such as FeNi, CoFe or FeN provided on a substrate 11 of $Al_2TiC$. On the foregoing lower magnetic shield layer 12, there is provided a spacer layer 13 of a non-magnetic material such as $Al_2O_3$, and a magnetic sensor 14 having a spin-valve structure is formed on the spacer layer 13.

The magnetic sensor 14 is covered by another spacer layer 15 also of a non-magnetic material similar to the spacer layer 13, and an upper magnetic shield layer 16 of a soft magnetic material such as FeNi or CoFe is provided on the spacer layer 15. Thereby, the spacer layer 13, the magnetic sensor 14 and the spacer layer 15 form together a minute magnetic read gap between the upper and lower magnetic shield layers 12 and 16 with a size of about 200 nm.

On the upper magnetic shield layer 16, there is provided another spacer layer 17 of a non-magnetic material with a thickness of about 350 nm, and a coil pattern 19 is provided on the spacer layer 17 with an intervening insulation layer 18, wherein the insulation layer 18 continuously has a reducing thickness toward a front end 10A of the magnetic head 10. The coil pattern 19 is covered by another insulation layer 20, and a magnetic pole 21 of a magnetic material such as FeNi or CoFe is provided on the foregoing another insulation layer 20 such that the thickness of the insulation layer 20 decreases continuously toward the foregoing front end 10A of the magnetic head 10. As a result of the decreasing thickness of the insulation layers 18 and 20 at the front end 10A of the magnetic head 10, the magnetic pole 21 makes direct contact with the spacer layer 17 at the front end is formed 10A. There a minute magnetic write gap is formed between the upper magnetic shield 16 and the magnetic pole 21. It should be noted that the upper magnetic shield 16 extends to the magnetic pole 21 at a part not illustrated in FIG. 1 and a magnetic circuit is formed.

The magnetic head 10 scans the surface of a magnetic recording medium such as a magnetic disk at the foregoing front edge surface 10A, and the magnetic sensor 14 detects the magnetization recorded on the surface of the magnetic recording medium at the foregoing magnetic read gap. Further, a recording of information is made on the magnetic recording medium at the foregoing write gap by energizing the coil 19 by an information signal.

FIG. 2 shows the construction of the magnetic sensor 14 in detail, wherein those parts explained already with reference to FIG. 1 are designated by the same reference numerals and the description thereof will be omitted.

Referring to FIG. 2, the magnetic sensor 14 includes a magnetic detection layer or so-called "free layer" 14A of a soft magnetic material such as CoFe or NiFe formed on the spacer layer 14, wherein the free layer changes the direction of magnetization freely in response to the magnetization of the magnetic recording medium.

On the free layer 14A, there is provided an intermediate layer 14B of a non-magnetic material such as Cu, and a fixed magnetization layer or so-called "pinned layer" 14C is provided on the intermediate layer 14B with a predetermined fixed magnetization, wherein the pinned layer 14C is formed of a soft magnetic material such as CoFe or NiFe similarly to the free layer 14B. It should be noted that the magnetization of the pinned-layer 14C is fixed in the direction of magnetization of a magnetization-fixing layer or so-called "pinning layer" 14D, wherein the pinning layer 14D is formed of an anti-ferromagnetic material such as FeMn or PdPtMn and provided on the pinned layer 14C. It should be noted that the pinning layer 14D fixes the magnetization of the pinned layer 14C by spin-exchange interaction. Thereby, the magnetization of the magnetic recording medium is detected by detecting a change of electric resistance that occurs in response to the change of direction of magnetization in the free layer 14A with respect to the direction of magnetization in the pinned layer 14C. In FIGS. 1 and 2, it should be noted that the electrodes for detecting the foregoing resistance change is omitted from illustration. Further, it should be noted that the pinning layer 14D, lacking a spontaneous magnetization, is relatively immune to the external magnetic field.

In the magnetic sensor 14 having such a construction, in which the direction of magnetization of the free layer 14A changes in response to the direction of magnetization of the magnetic recording medium; it should be noted that the resistance of the magnetic sensor 14 becomes minimum when the direction of magnetization of the layer 14A is parallel to the direction of the magnetization of the pinned layer 14C. When the direction of magnetization of the layer 14A is in an anti-parallel relationship with the direction of magnetization of the pinned layer 14C, on the other hand, the resistance of the magnetic sensor 14 becomes maximum.

Figure 3A:
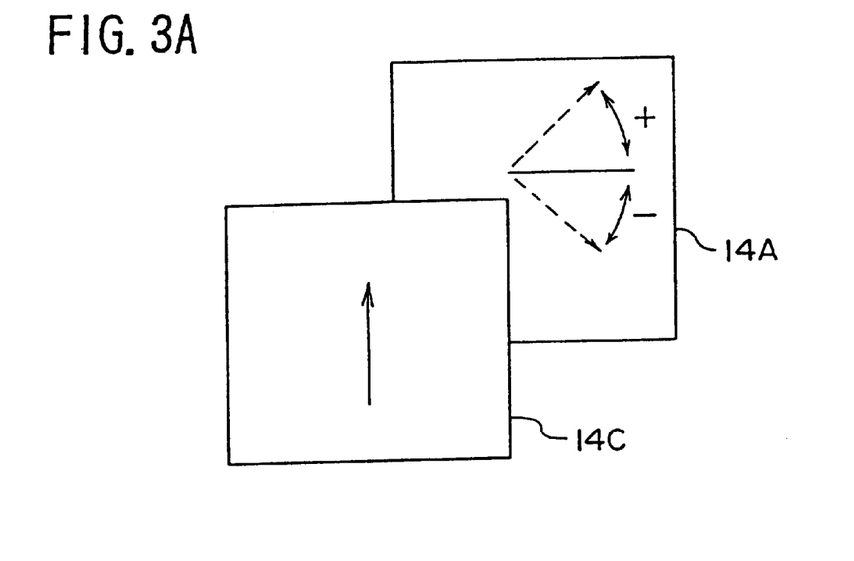
FIGS. 3A and 3B are diagrams showing the principle of an ideal spin-valve magnetic sensor that changes a resistance value thereof symmetrically with the direction of magnetization of a recording medium.
Figure 3B:
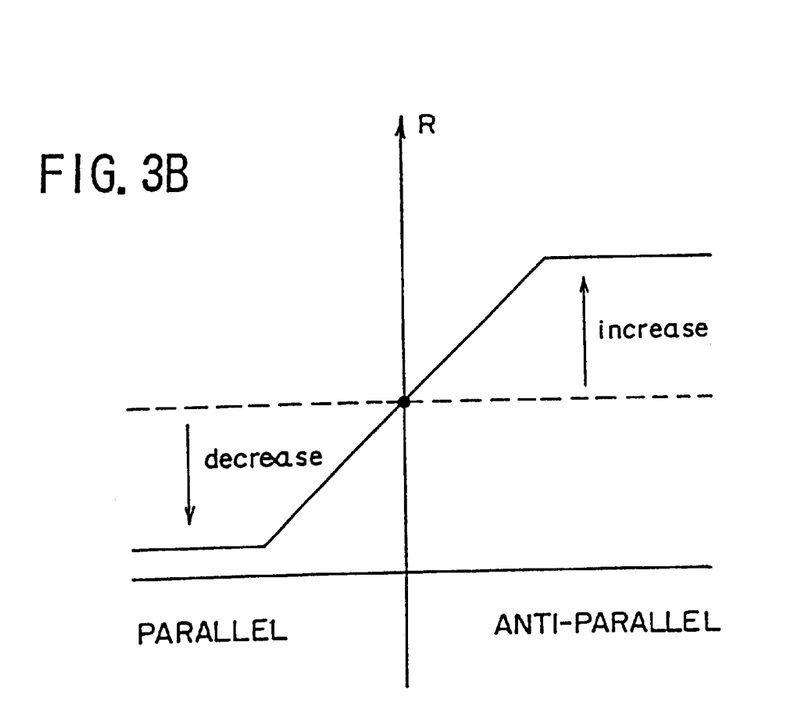

In the case of using the magnetic sensor 14 for the magnetic head 10, it is advantageous to set the direction of magnetization of the pinned layer 14C perpendicular to the direction of magnetization of the free layer 14A in a free state in which there is no external magnetic field applied to the magnetic sensor 14. See FIG. 3A. By doing so, the resistance of the magnetic sensor 14 is increased or decreased generally symmetrically depending on whether the magnetization of the magnetic recording medium is parallel or anti-parallel to the magnetization of the pinned layer 14C, as indicated in FIG. 3B. Such a generally symmetric increase and decrease of the resistance facilitates the signal processing in the magnetic recording and reproducing apparatus.

It should be noted that the control of magnetization of a magnetic body is conducted in a heat treatment process.

Figure 4:
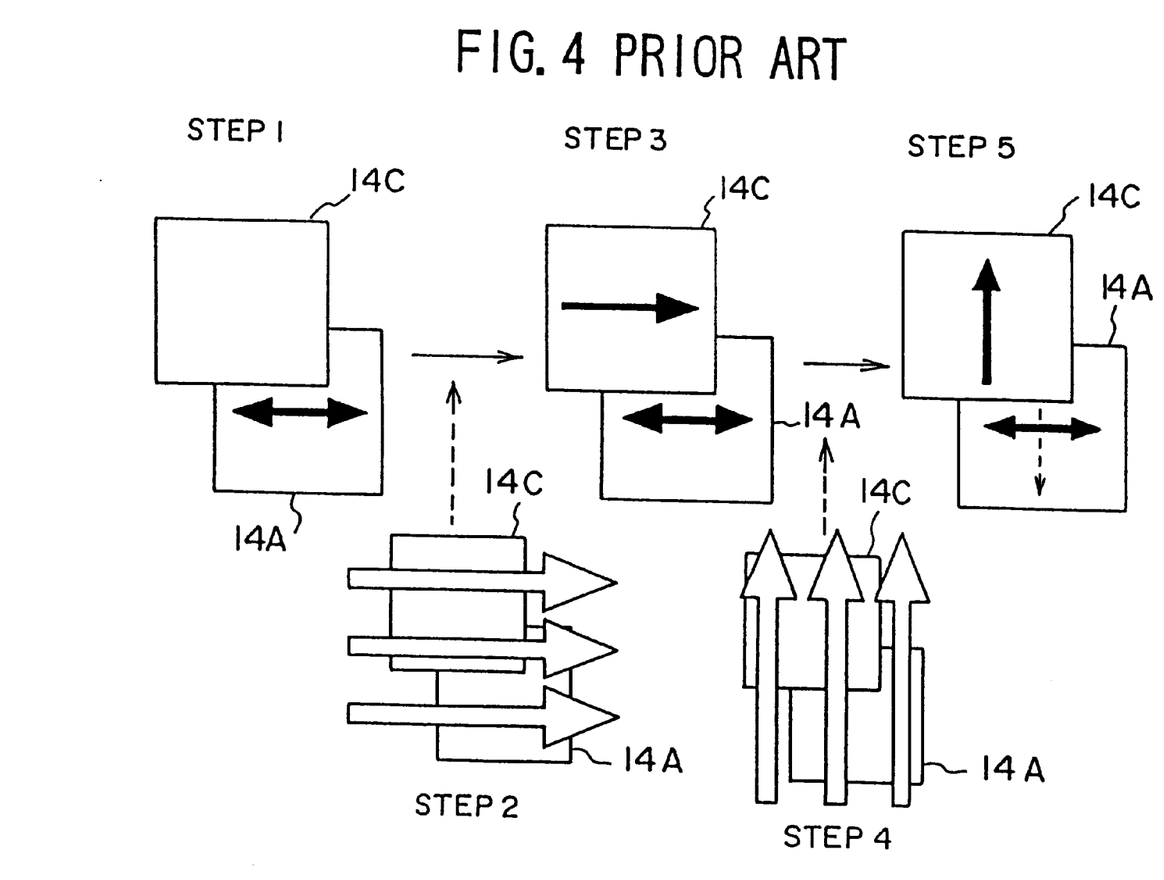
FIG. 4 is a diagram showing a conventional process of forming the spin-valve magnetic sensor of FIG. 2.

FIG. 4 shows a heat treatment process conducted conventionally in the process of forming the spin-valve structure of FIG. 2.

Referring to FIG. 4, the spin valve structure of FIG. 2 is formed in a step 1 of FIG. 4 by depositing the layers 14A–14D under the existence of an initial magnetic field with a predetermined initial direction designated as a 0° direction. The free layer 14A thus formed has an easy axis of magnetization in the foregoing 0° direction.

Next, in the step 2 of FIG. 4, the spin-valve structure of FIG. 2 is subjected to a thermal annealing process to a temperature close to a blocking temperature of the pinning layer 14D, and a magnetic field is applied in the foregoing 0° direction as indicated by blank arrows. As a result, the direction of magnetization of the pinned layer 14C is aligned in the 0° direction.

Figure 5A:
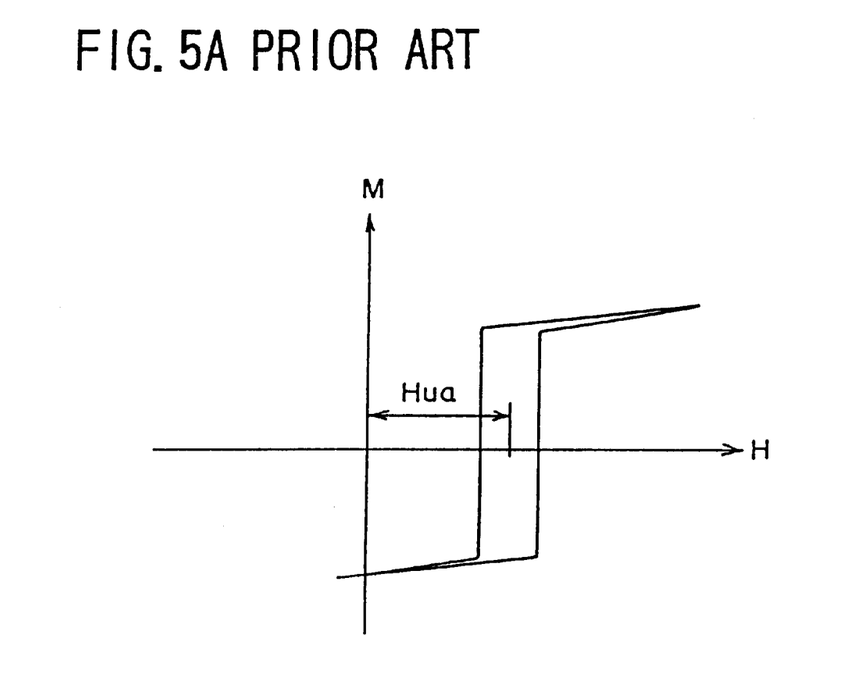
FIGS. 5A and 5B are diagrams explaining the blocking temperature.
Figure 5B:
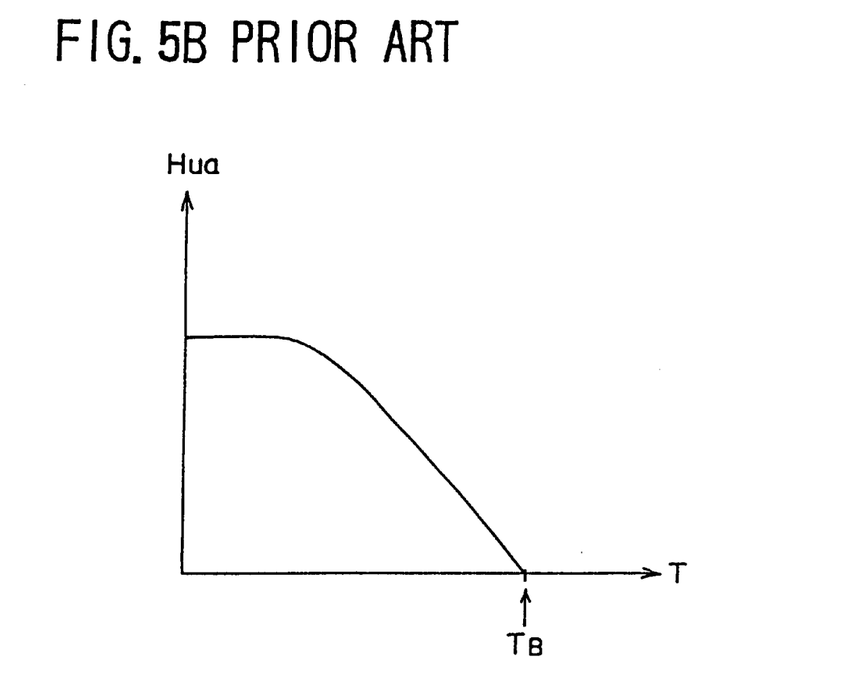

FIGS. 5A and 5B explain the blocking temperature.

In a magnetic system in which an anti-ferromagnetic layer and a soft magnetic layer form an exchange coupling as in the case of the spin-valve structure of FIG. 2, it should be noted that the hysteresis curve of the magnetic system is displaced along the horizontal axis representing the magnetic field H by an amount Hua as indicated in FIG. 5A as a result of the pinning of magnetization caused in the soft magnetic layer such as the pinned layer 14C by the anti-ferromagnetic pinning layer 14D. This phenomenon means that it is insufficient in a magnetic system that includes such an anti-ferromagnetic layer, to apply a magnetic field just enough to cause an inversion of magnetization in an ordinary magnetic system not including an anti-ferromagnetic layer, for causing an inversion of magnetization. In order to achieve this, it is necessary to increase the magnetization by an amount Hua, This is the pinning of magnetization.

FIG. 5B shows the temperature dependence of the quantity Hua.

Referring to FIG. 5B, it should be noted that the quantity Hua decreases with increasing temperature and reaches zero at a blocking temperature $T_B$. In other words, the magnetization of the spin valve structure of FIG. 2 can be controlled as desired by an external magnetic field when the system is heated to a temperature close to or higher than the blocking temperature $T_B$. The pinning of magnetization in such a magnetic system is eliminated when the system is heated to the blocking temperature $T_B$ or higher.

Referring back to FIG. 4, the pinned layer 14C is magnetized in the foregoing 0° direction as a result of the thermal annealing process conducted at the temperature close to the blocking temperature $T_B$, and the anti-ferromagnetic pinning layer 14D forms an exchange coupling with the pinned layer 14C. By cooling the structure thus formed to room temperature environment in the step 3 of FIG. 4, a structure in which the pinned layer 14C is magnetized in the 0° direction is obtained. In the structure of step 3 of FIG. 4, the magnetization of the pinned layer 14C is pinned by the pinning layer 14D. As a result of the thermal annealing process in the step 2 of FIG. 4, the magnetic shield layers 12 and 16 and the magnetic pole 21 forming the magnetic head 10 of FIG. 1 are all magnetized in the foregoing 0° direction.

Next, in the step 4 of FIG. 4, the structure of step 3 of FIG. 4 is heated to a temperature close to the blocking temperature $T_B$ again, and an external magnetic field is applied to the spin valve structure in a direction perpendicular to the foregoing 0° direction. As a result, the magnetization of the pinned layer 14C is rotated by 90°, and a structure shown in step 5 of FIG. 4 is obtained, in which it should be noted that the direction of magnetization of the pinned layer 14C is perpendicular to the direction of easy axis of magnetization of the free layer 14A.

In the process of FIG. 4, however, there arises a problem, associated with the fact that the entire magnetic head 10 including the spin-valve magnetic sensor 14 is heated to the temperature close to the blocking temperature $T_B$, in that the direction of magnetization of the magnetic shields 12 and 16 or the direction of magnetization of the magnetic pole 21, which has been initialized in the step 2, may be changed unwantedly. Further, such thermal annealing and magnetization processes conducted at the temperature close to the blocking temperature may cause a 90° rotation in the easy axis of magnetization from the desired 0° direction as indicated by a broken arrow in step 5 of FIG. 4. When this occurs, the detection characteristic of the magnetic sensor 14 is modified from the characteristic of FIG. 3B and the magnetic sensor 14 would produce an asymmetric output in response to the magnetization of the magnetic recording medium.

SUMMARY OF THE INVENTION

Accordingly, it is a general object of the present invention to provide a novel and useful magnetic head, a fabrication process thereof, and a magnetization control method of a magnetic film, wherein the foregoing problems are eliminated.

Another and more specific object of the present invention is to provide a magnetic head using a spin-valve magnetic sensor wherein the direction of easy axis of magnetization of a free layer is set perpendicular to the direction of magnetization of a pinned layer.

Another object of the present invention is to provide a spin-valve magnetic head, comprising:

a first ferromagnetic layer having a first easy axis of magnetization extending in a first direction;

a second ferromagnetic layer provided on said first ferromagnetic layer with a separation therefrom, said second ferromagnetic layer having a magnetization in a direction substantially perpendicular to said first easy axis of magnetization; and an anti-ferromagnetic layer provided on said second ferromagnetic layer in exchange coupling therewith;

said second ferromagnetic layer having a second easy axis of magnetization extending in a direction intersecting said second direction.

Another object of the present invention is to provide a method of fabricating a spin-valve magnetic head including a layered body of a first ferromagnetic layer having a first easy axis of magnetization extending in a first direction, a non-magnetic layer formed on said first ferromagnetic layer, a second ferromagnetic layer provided on said non-magnetic layer, and an anti-ferromagnetic layer provided on said second ferromagnetic layer in exchange coupling therewith, said method comprising:

a first thermal annealing process including the steps of: annealing said layered body in a first annealing state; and applying a magnetic field to said layered body in a second direction different from said first direction while maintaining said layered body in said first annealing state; and a second thermal annealing process including the steps of: annealing said layered body, after said first thermal annealing process, in a second annealing state; and applying a magnetic field in a third direction different from said second direction while maintaining said layered body in said second annealing state.

Another object of the present invention is to provide a method of fabricating a spin-valve magnetic head including a layered body of a first ferromagnetic layer having a first easy axis of magnetization extending in a first direction, a non-magnetic magnetic layer formed on said first ferromagnetic layer, a second ferromagnetic layer provided on said non-magnetic layer, and an anti-ferromagnetic layer provided on said second ferromagnetic layer in exchange coupling therewith, said method comprising the steps of:

annealing said layered body; and applying a magnetic field to said layered body in a second direction different from said first direction while annealing said layered body;

wherein said second direction intersects said first direction with an angle exceeding 90°.

Another object of the present invention is to provide a method of magnetizing a magnetic system including a ferromagnetic layer magnetized in a first direction and an anti-ferromagnetic layer provided on said ferromagnetic layer in exchange coupling therewith, said method comprising:

a first thermal annealing process including the steps of: annealing said magnetic system in a first annealing state; and applying a magnetic field to said magnetic system in a second direction different from said first direction while maintaining said magnetic system in said first annealing state; and     a second thermal annealing process including the steps of: annealing said magnetic system, after said first thermal annealing process, to a second annealing state; and applying a magnetic field in a third direction different from said second direction while maintaining said magnetic system in said second annealing state.

Another object of the present invention is to provide a method of magnetizing a magnetic system including a ferromagnetic layer magnetized in a first direction and an anti-ferromagnetic layer provided on said ferromagnetic layer in exchange coupling therewith, said method comprising:

annealing said magnetic system; and applying a magnetic field to said magnetic system in a second direction different from said first direction while annealing said magnetic system, to cause a rotation of magnetization in said ferromagnetic layer to a desired angle;

wherein said second direction intersects said first direction with an angle exceeding said desired angle.

According to the present invention, the annealing process for rotating the magnetization of the second ferromagnetic layer is conducted at a low temperature set such that no substantial rotation occurs in the easy axis of magnetization of the first as well as second ferromagnetic layers. As the temperature used for the annealing process is set low as such, the process of rotating the magnetization may be conducted in plural times by rotating the direction of the external magnetic field stepwise each time. In this case, it is particularly advantageous to set the direction of the external magnetic field to a direction exactly opposing the first direction in the final annealing process. Thereby, the easy axis of magnetization of the first ferromagnetic layer is aligned exactly to the first direction even when the direction of the easy axis of magnetization is offset slightly as a result of the annealing processes. When the rotation of magnetization of the second ferromagnetic layer is to be conducted in a single step, on the other hand, the direction of the external magnetic field is set with an excessive, offset angle with respect to the desired direction of magnetization.

As a result of the low temperature heat treatment processes, other magnetic members or parts of the magnetic head are not affected or deteriorated even when the annealing is applied repeatedly for causing the desired rotation of the magnetization, and the magnetic head shows a near-ideal resistance change as indicated in FIG. 3B. In the magnetic head of the present invention, the direction of magnetization of the second ferromagnetic layer does not coincide with the direction of the easy axis of magnetization thereof.

Other objects and further features of the present invention will become apparent from the following detailed description when read in conjunction with the attached drawings.

DETAILED DESCRIPTION OF THE PREFERRED EMBODIMENTS FIRST EMBODIMENT

Figure 6:
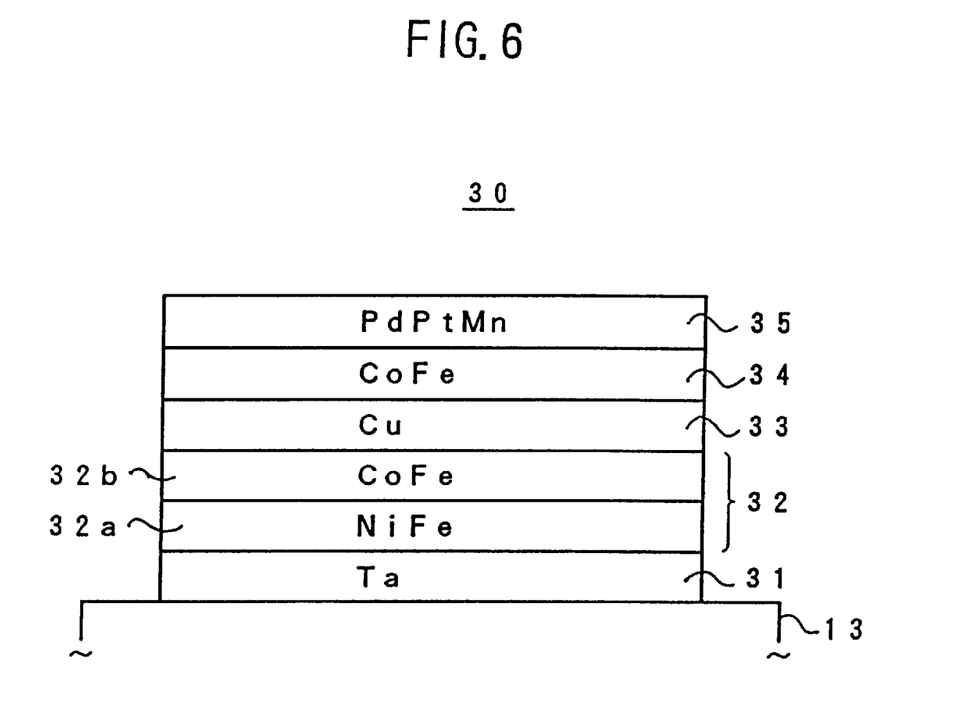
FIG. 6 is a diagram showing the fundamental construction of the spin-valve magnetic sensor according to the present invention.

FIG. 6 shows the construction of a spin-valve magnetic sensor 30 according to a first embodiment of the present invention wherein the spin-valve magnetic sensor 30 is used in the magnetic head 10 of FIG. 1 in place of the spin-valve magnetic sensor 14.

Referring to FIG. 6, the spin-valve magnetic sensor 30 includes a Ta film 31 formed on the spacer layer 13 with a thickness of about 10 nm, and a NiFe film 32a is formed on the Ta film 31 with a thickness of about 2 nm. On the NiFe film 32a, there is provided a CoFe film 32b with a thickness of about 5.5 nm, wherein the films 32a and 32b form a ferromagnetic free layer 32 corresponding to the free layer 14A of FIG. 2.

In the structure of FIG. 6, a non-magnetic layer 33 of Cu is formed in correspondence to the non-magnetic layer 14B of FIG. 2 with a thickness about 3.5 nm, and a pinned layer 34 of CoFe is formed on the non-magnetic layer 33 in correspondence to the ferromagnetic pinned layer 14c of FIG. 2, with a thickness of about 3.5 nm. On the pinned layer 34, there is formed a pinning layer 35 of PdPtMn in correspondence to the pinning layer 14D with a thickness of about 25 nm. The pinning layer 35 is formed directly on the pinned layer 34 and establishes an exchange coupling with the layer 35. It should be noted that the pinning layer 35 has a blocking temperature of about 300° C.

Figure 7:
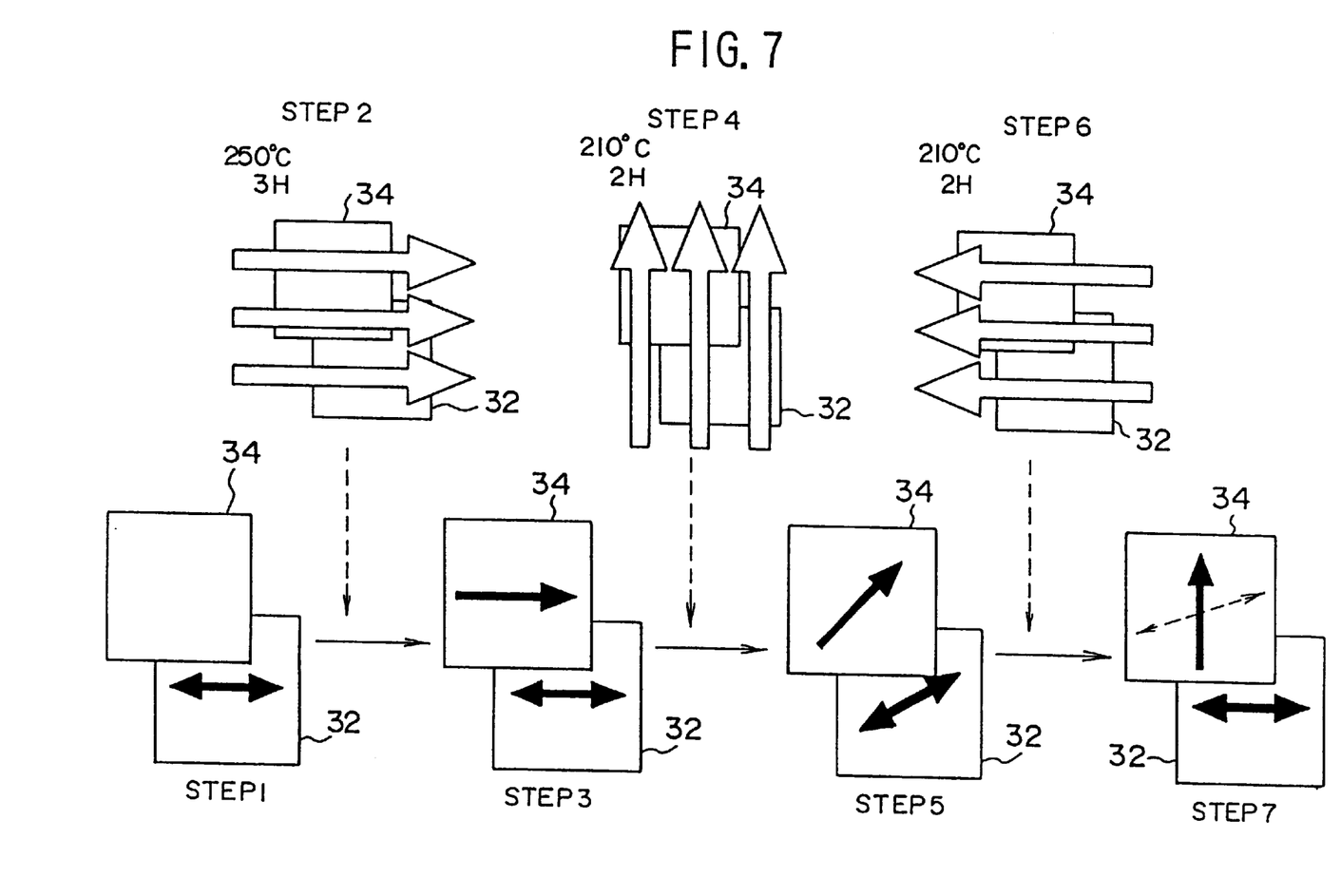
FIG. 7 is a diagram showing the fabrication process of a magnetic head according to a first embodiment of the present invention.

FIG. 7 shows the thermal annealing process conducted on the structure of FIG. 6 according to a first embodiment of the present invention, wherein it should be noted that the thermal annealing process of FIG. 7 is conducted in a state that the spin-valve magnetic sensor 30 is attached integrally to the magnetic head 10.

Referring to FIG. 7, the structure of FIG. 2 is formed in the step 1 while applying a predetermined magnetic field in a predetermined direction, and the free layer 32 thus formed has the magnetization as well as the easy axis of magnetization in the direction shown in the step 1 with a solid arrow. This direction is defined as a "0° direction."

Next, in the step 2, the spin-valve sensor 30 is held in a d.c. magnetic field of 2.5 kOe and annealed at a temperature of about 250° C. for about 3 hours. As a result of the thermal annealing process of the step 2, the direction of magnetization and the direction of easy axis of magnetization are aligned in the 0° direction as indicated by a solid arrow in the step 3 of FIG. 7. The thermal annealing process of the step 2 of FIG. 7 is conducted in a high vacuum environment in which the pressure is set to $1.5 \times 10^{-5}$ Pa or lower. The state of the step 3 is designated as initial state. As a result of the thermal annealing process in the step 2, the magnetic shield layers 12 and 16 and further the magnetic pole 21 are magnetized in the initial step 3 of FIG. 7 in the foregoing 0° direction.

Next, in the step 4 of FIG. 7, the spin-valve magnetic sensor 30 is applied with an external magnetic field acting perpendicularly to the foregoing 0° direction and a thermal annealing process is applied at a temperature of about 210° C. for about 2 hours. It should be noted that the temperature of 210° C. is substantially lower than the temperature of 250° C. used in the thermal annealing process in the step 2 of FIG. 7. In the thermal annealing process of the step 4, the magnitude of the external magnetic field is set identical to the case of the step 2, and the thermal annealing process is conducted under the high vacuum environment of $1.5 \times 10^{-5}$ Pa or lower in pressure.

Figure 8A:
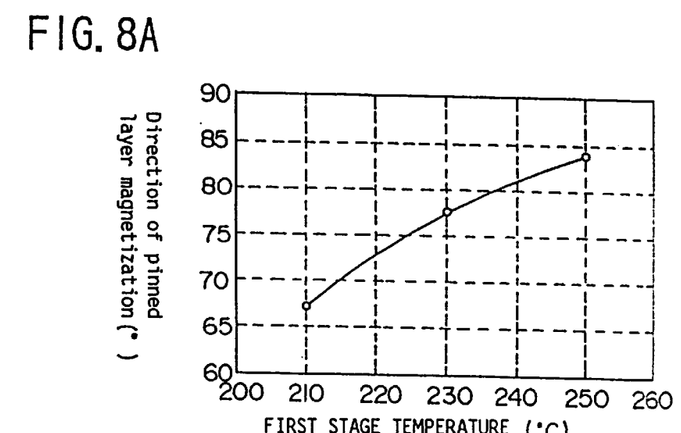
FIGS. 8A–8C are diagrams showing a rotation of magnetization or easy axis of magnetization that occurs in a magnetic layer in the thermal annealing processes of FIG. 7.

FIG. 8A shows the change of direction of the magnetization in the pinned layer 34 for the case in which the temperature of the thermal annealing process is changed from 210° C. to 250° C. As already noted, the external magnetic field is applied in the direction substantially perpendicular to the initial magnetization direction similarly to the step 4 of FIG. 7. In FIG. 8A, the duration of the thermal annealing process is set to 3 hours, which is slightly longer than the duration used in the step 4 of FIG. 7.

Referring to FIG. 8A, it can be seen that the magnetization of the pinned layer 34 causes a rotation of about 84° when the temperature of the thermal annealing process is set to 250° C. in the step 4 similarly to the case of the step 2 of FIG. 7. However, the amount of rotation is decreased to about 77° when the temperature of the thermal annealing process is reduced to about 230° C. Further, the amount of rotation is reduced to about 67° when the temperature of the thermal annealing process is reduced to about 210°, which is the temperature used in the step 4 of FIG. 7.

This means that the full 90° rotation of the magnetization is not possible in the low temperature thermal annealing process used in the step 4 of FIG. 7, even when the duration of the thermal annealing process is continued for 3 hours or more, and the direction of magnetization of the pinned layer 34 obtained in the thermal annealing process of the step 4 forms an intermediate angle between the 0° direction and the 90° direction. Further, the free layer 32 may also cause some rotation of magnetization as a result of the thermal annealing process in the step 4 of FIG. 7.

Thus, in the present invention, a step 6 shown in FIG. 7 is conducted after the step 5, in which an external magnetic field acting in the substantially opposing direction (180°) to the foregoing 0° direction is applied to the spin-valve magnetic sensor 30, and a thermal annealing process is conducted at a temperature of about 210° C. for 2 hours in this state similarly to the thermal annealing process in the step 4 of FIG. 7. As a result of the thermal annealing process of the step 6, the magnetization of the pinned layer 34 now extends in the direction perpendicular to the initial 0° direction as indicated in the step 7 of FIG. 7. In the step 7, it should further be noted that, as a result of the thermal annealing process conducted under the existence of the external magnetic field acting in the 180° direction, the magnetization of the free layer 32, which has been slightly offset from the 0° direction in the step 5, is once again aligned to the initial 0° direction.

Figure 8B:
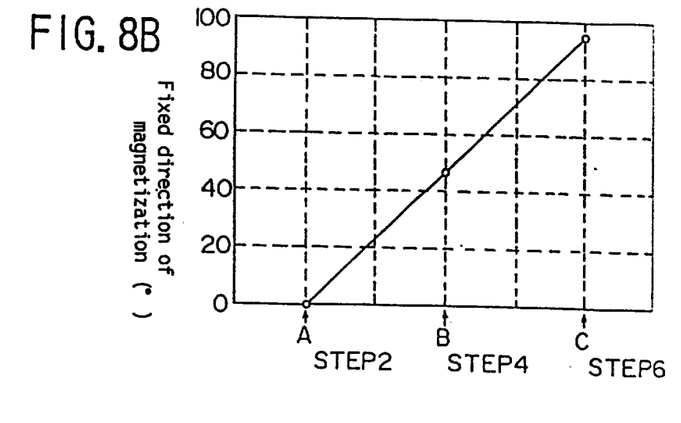

FIG. 8B shows the rotation of the magnetization of the pinned layer 34 occurring in each of the thermal annealing steps 2, 4 and 6 represented respectively as A, B and C. As can be seen in FIG. 8B, the 90° rotation of the magnetization is successfully achieved by repeating the thermal annealing steps. In the point B corresponding to the step 4, it should be noted that the amount of rotation is about 45°, which is smaller than the rotation angle of about 67° shown in FIG. 8A for the same temperature. This discrepancy between these different rotational angles is caused merely as a result of the difference in the duration of the thermal annealing process in the experiment of FIG. 8A and in the experiment for FIG. 8B.

As already explained with reference to FIGS. 3A and 3B, the spin-valve magnetic sensor 30 of the present embodiment increases or decreases the resistance depending on the direction of magnetization on a recording medium symmetrically.

Figure 8C:
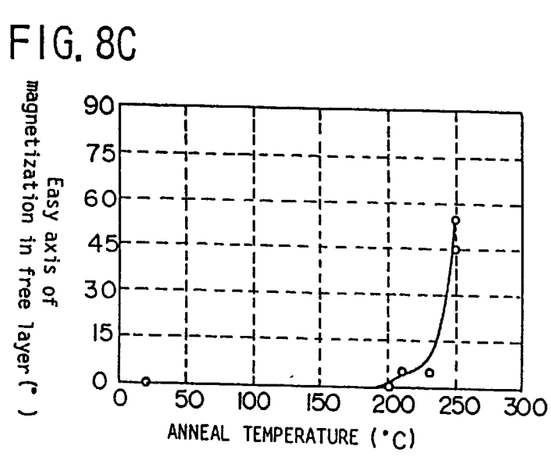

FIG. 8C shows the rotation of the easy axis of magnetization of the free layer 32 for the case in which the temperature of the thermal annealing process is changed in the step 4 of FIG. 7.

Referring to FIG. 8C, the easy axis of magnetization rotates significantly when the thermal annealing process of the step 4 is conducted at the conventional temperature of about 250° C. On the other hand, the easy axis of magnetization rotates little when the thermal annealing process is conducted at the temperature of about 210° C. as in the case of the present invention. Even if such a rotation occurred, the magnitude of the rotational angle is limited without 10°. The same applies also to the thermal annealing process conducted at 230° C.

In relation to the finding of FIG. 8C, it should be noted that the thermal annealing process at 210° C. does not cause a rotation of easy axis of magnetization in the pinned layer 34 that has a composition substantially identical to the composition of the free layer 32, as indicated by a broken line in the step 7 of FIG. 7. In other words, the spin valve magnetic 30 that has been applied with a low temperature thermal annealing process for causing the rotation of magnetization of the pinned layer characteristically shows a feature that the direction of magnetization and the direction of easy axis of magnetization are different in the pinned layer 34.

In the present embodiment, it is also possible to conduct the process of the step 4 of FIG. 7 in plural times each with a reduced duration for the thermal annealing process.

SECOND EMBODIMENT

Figure 9:
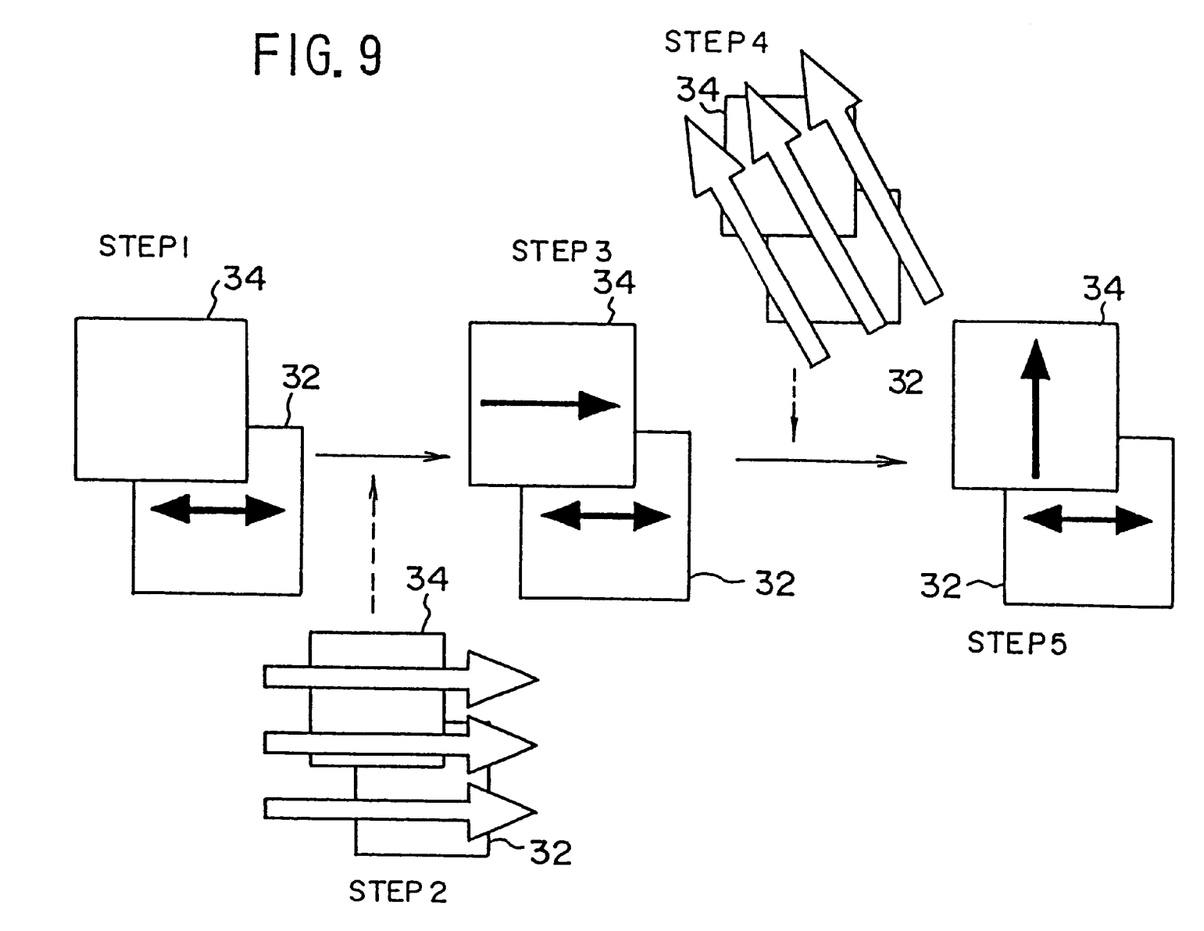
FIG. 9 is a diagram showing the fabrication process of a magnetic head according to a second embodiment of the present invention.

FIG. 9 shows a fabrication process of the spin valve magnetic sensor 30 according to a second embodiment of the present invention, wherein those parts corresponding to the parts described previously are designated by the same reference numerals and the description thereof will be omitted. It should be noted that the magnetic sensor 30 itself has a construction described already with reference to FIG. 6.

Referring to FIG. 9, the spin valve magnetic sensor 30 is subjected, after the process of the steps 1–3 corresponding to the steps 1–3 of FIG. 7, a thermal annealing process which is conducted in a high vacuum environment at 210° C. under the existence of an external magnetic field, wherein the direction of the external magnetic field is set such that the magnetization of the pinned layer 34 intersects perpendicularly, after the step 4 of FIG. 9, to the initial 0° direction of magnetization in the step 3.

As explained already, the angle that the magnetization of the pinned layer 34 forms with the initial 0° direction of magnetization becomes smaller than 90° when the direction of the external magnetic field is set perpendicularly to the foregoing initial direction of magnetization. Thus, in order to achieve the foregoing 90° angle for the magnetization of the pinned layer 34 from the 0° direction, the present embodiment sets an offset angle in the direction of the external magnetic field such that the external magnetic field forms an angle larger than 90° with respect to the initial direction of magnetization.

Figure 10A:
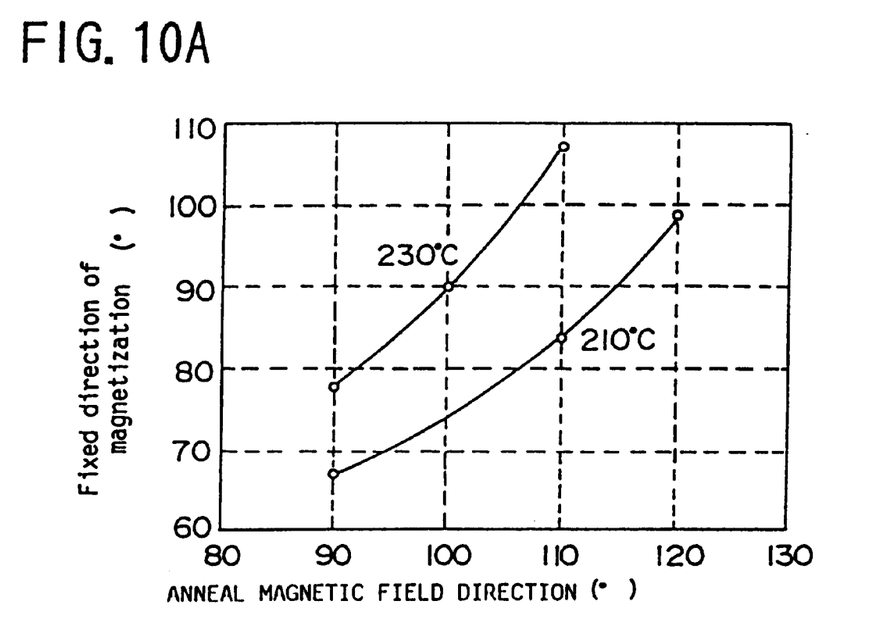
FIGS. 10A and 10B are diagrams showing a rotation of magnetization occurring in a magnetic layer in the thermal annealing processes of FIG. 9.

FIG. 10A shows the relationship between the direction of the external magnetic field in the step 4 of FIG. 9 and the actual direction of magnetization of the pinned layer 34, wherein FIG. 10A shows the result for the case in which the external magnetic field has an intensity of 1.5 kOe and the thermal annealing process is continued for 3 hours.

Referring to FIG. 10A, the desired perpendicular intersection of the magnetization of the pinned layer 34 with respect to the initial direction of magnetization is achieved successfully, when the thermal annealing process is conducted at 210° C., by setting the angle of the external magnetic field to about 115°, which is about 25° larger than the nominal 90° angle. When the thermal annealing process is conducted at 230° C., this offset angle is reduced to about 10°.

Thus, it is possible to reduce the offset angle of the external magnetic field by increasing the temperature of the thermal annealing process. However, such an increase of the thermal annealing process applied to the magnetic head 10, in which the magnetic sensor 30 is included, tends to induce a deterioration in the magnetization of the magnetic shield layers 12 and 16 or in the magnetization of the magnetic pole 21, as explained already. Thus, in order to avoid such adversary problems, it is preferable to conduct the thermal annealing process at the temperature lower than about 210° C., in which no substantial rotation occurs in the easy axis of magnetization of the free layer 32.

Figure 10B:
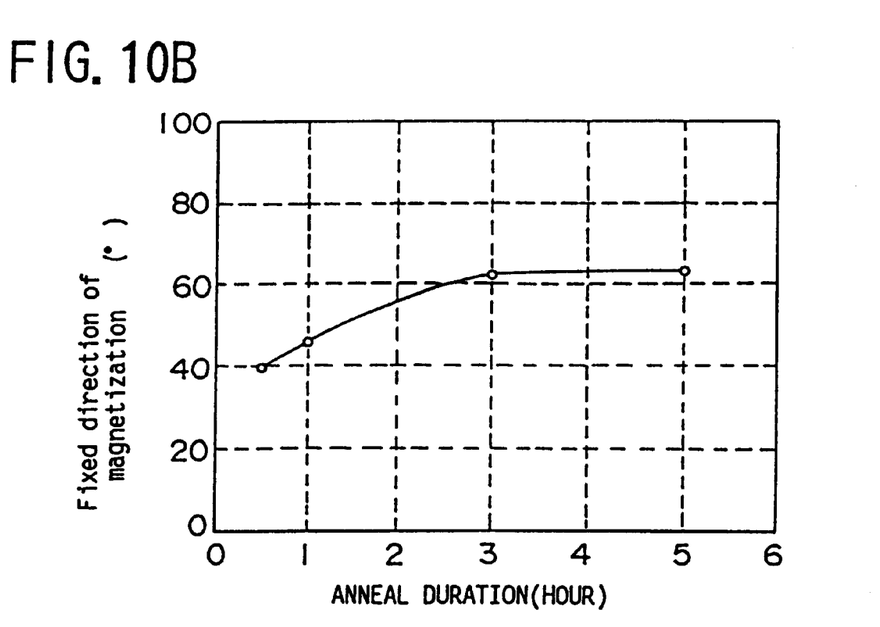

FIG. 10B shows the rotation of magnetization of the pinned layer 34 in the step 4 of FIG. 9 for the case in which the duration of the thermal annealing process is changed.

Referring to FIG. 9B, it can be seen that the rotational angle increases generally with the duration of thermal annealing process up to about 3 hours. This in turn means that the duration of the thermal annealing process may be reduced by setting the offset angle of the external magnetic field somewhat larger in the step 4 of FIG. 5.

In the present embodiment, as well as in the previous embodiment, the thicknesses and compositions of the free layers 32a and 32b, non-magnetic layer 33, pinned layer 34 and the pinning layer 35 are not limited to those described previously but other thicknesses and other compositions may also be used. Particularly, the pinning layer 35 may be formed of a material other than PdPtMn such as NiMn, PtMn, PdMn, IrMn, RhMn and an alloy thereof.

Further, the present invention is by no means limited to those embodiments described heretofore, but various variations and modifications may be made without departing from the scope of the invention.

What is claimed is:

1. A method of magnetizing a magnetic system including a ferromagnetic layer magnetized in a first direction and an anti-ferromagnetic layer provided on said ferromagnetic layer in exchange coupling therewith, said method comprising:

a first thermal annealing process including the sub-steps of: annealing said magnetic system in a first annealing state; and applying a magnetic field to said magnetic system in a second direction different from said first direction while maintaining said magnetic system in said first annealing state; and a second thermal annealing process including the sub-steps of: annealing said magnetic system, after said first thermal annealing process, to a second annealing state; and applying a magnetic field in a third direction different from said second direction while maintaining said magnetic system in said second annealing state.

2. A method as claimed in claim 1, wherein said second direction is rotated in a first angular direction with respect to said first direction, and wherein said third direction is rotated further in said first angular direction with respect to said second direction.

3. A method as claimed in claim 1, wherein said third direction is rotated by about 180° with respect to said first direction.

4. A method as claimed in claim 1, wherein said second direction is rotated by about 90° with respect to said first direction.

5. A method as claimed in claim 1, wherein said first and second thermal annealing processes are conducted at a temperature lower than the blocking temperature of said anti-ferromagnetic layer.

6. A method as claimed in claim 1, wherein said first and second thermal annealing processes are conducted at a temperature set such that no substantial rotation occurs in an easy axis of magnetization of said ferromagnetic layer.

* * * * *